United States Patent [19]
Takahara et al.

[11] Patent Number: 5,317,351
[45] Date of Patent: May 31, 1994

[54] POSITION DETECTING DEVICE

[75] Inventors: Hiroyuki Takahara, Yokohama; Shigeru Ogino; Masayoshi Sekine, both of Tokyo, all of Japan

[73] Assignee: Canon Kabushiki Kaisha, Tokyo, Japan

[21] Appl. No.: 811,057

[22] Filed: Dec. 20, 1991

[30] Foreign Application Priority Data

Dec. 21, 1990 [JP] Japan .................................. 2-412617
Nov. 28, 1991 [JP] Japan .................................. 3-314559

[51] Int. Cl.$^5$ .......................... G03B 1/18; H01G 5/14
[52] U.S. Cl. .................. 354/195.1; 361/296; 324/660
[58] Field of Search ............... 354/195.1, 195.12, 400; 361/287, 296; 324/160, 660

[56] References Cited

U.S. PATENT DOCUMENTS

| | | | |
|---|---|---|---|
| 3,221,256 | 11/1965 | Walden | 361/296 |
| 4,420,754 | 12/1983 | Andermo | 324/660 |
| 4,816,859 | 3/1989 | Maruyama et al. | 354/400 |
| 5,136,286 | 8/1992 | Veneruso | 324/660 X |

FOREIGN PATENT DOCUMENTS 62-262009 11/1987 Japan.

Primary Examiner—Michael L. Gellner
Assistant Examiner—Jae N. Noh
Attorney, Agent, or Firm—Fitzpatrick, Cella, Harper & Scinto

[57] ABSTRACT

A position detecting device comprises a movable member, a first electrode movable with the movement of the movable member, and a second electrode disposed at a location opposed to the first electrode. The edge of at least one of the first and second electrodes are inclined with respect to the direction of movement of the first electrode, whereby the area over which the first electrode and the second electrode overlap each other is varied by the relative movement of the two electrodes and an electrostatic capacity provided by the two electrodes is also varied to make the detection of the absolute position of the movable member possible and to change a position detection accuracy in accordance with a position of the first electrode.

21 Claims, 12 Drawing Sheets

RELATIVE MOVEMENT

POSITION OF $L_2$ X

POSITION OF $L_2$

RELATIVE MOVEMENT

RELATIVE MOVEMENT

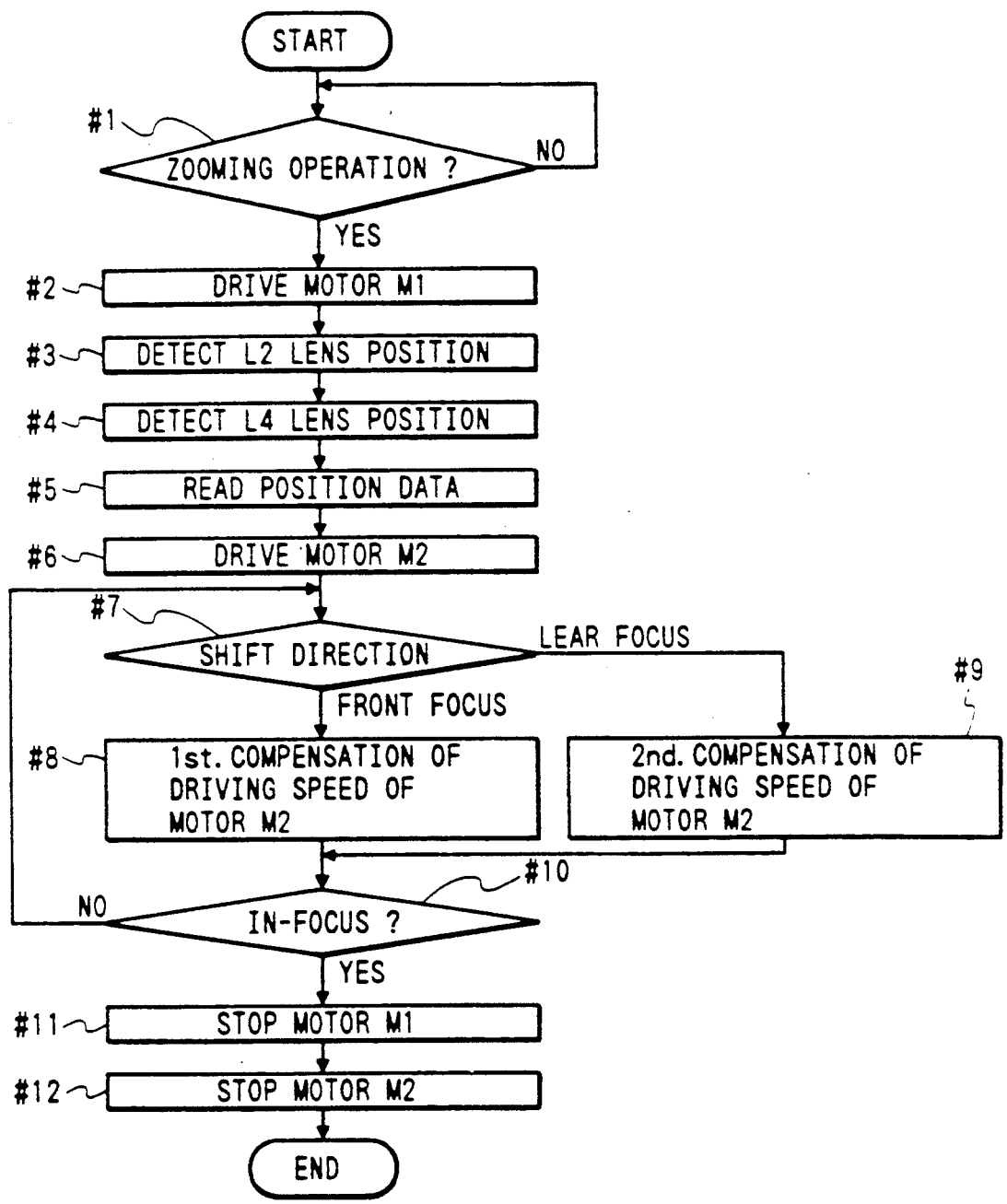

POSITION DETECTING DEVICE

BACKGROUND OF THE INVENTION

1. Field of the Invention

This invention relates to a device for detecting the position of a movable member on the basis of a variation in electrostatic capacity resulting from the relative movement of electrodes.

2. Related Background Art

A lens barrel mounted on a camera or the like is provided with a movable barrel holding a lens unit therein and moved in the direction of the optical axis relative to a fixed barrel for magnification change, focusing, etc., and recently the control of a lens system using the position data of said movable barrel (i.e., the position data of the lens unit) has been done. Therefore, various systems for exactly knowing the position of this movable barrel have been proposed, and among them, as an apparatus which is compact and which enables position detection by non-contact between the fixed barrel and the movable barrel, there is known one as shown, for example, in Japanese Laid-Open Patent Application No. 62-262009 wherein paying attention to the fact that electrodes are provided on the fixed barrel and the movable barrel, respectively, in opposed relationship with each other and in non-contact with each other to form a variable capacitor and the electrostatic capacity of this capacitor is varied by the fixed barrel and the movable barrel being moved relative to each other, the position of the movable barrel relative to the fixed barrel, i.e., the position of the lens, is detected from the electrostatic capacity on each occasion.

In the apparatus of the above-described construction, however, the position of the movable barrel (lens) relative to the fixed barrel has been known only from the information of the relative position, and a complicated circuit construction for knowing the absolute position of the movable barrel has been required. Further, of the pair of electrodes forming the variable capacitor, for example, the electrode on the fixed barrel side need be as long as the total amount of movement, and this has hampered the compactness of the device.

Also, in a position detecting device, particularly a lens barrel, when a fixed barrel (a lens) is moved in a fixed barrel in the direction of the optical axis, the imaging magnification of the lens is generally varied by the movement of the lens and sensitivity varies depending on the respective positions of the lens and thus, there are required different position detection accuracies depending on the position of the movable barrel, but the above-described prior-art device is of a construction in which the relation between the position of the movable barrel relative to the fixed barrel and the electrostatic capacity of the variable capacitor is always linear as shown in FIG. 10 of the accompanying drawings. This has led to the problem that there cannot be obtained an accurate position detection accuracy conforming to the position of the movable barrel.

SUMMARY OF THE INVENTION

Accordingly, one aspect of this invention is to provide a position detecting device which detects the absolute position of a movable member by a variation in an electrostatic capacity output from first and second electrodes moved relative to each other and in which at least one of the electrodes has its end sides inclined with respect to the direction of the relative movement, whereby an electrostatic capacity as absolute information can be obtained and the width of said one electrode in the direction of the relative movement can be made small relative to the amount of movement.

One aspect of this invention is to provide a position detecting device which detects the absolute position of a movable member by a variation in an electrostatic capacity output from first and second electrodes moved relative to each other and in which at least one of the electrodes has its shape changed so that detection accuracy may differ in conformity with the position of the movable member.

BRIEF DESCRIPTION OF THE DRAWINGS

FIG. 22 is a flow chart showing the control of the CPU of FIG. 15.

DETAILED DESCRIPTION OF THE PREFERRED EMBODIMENTS

Figure 1:
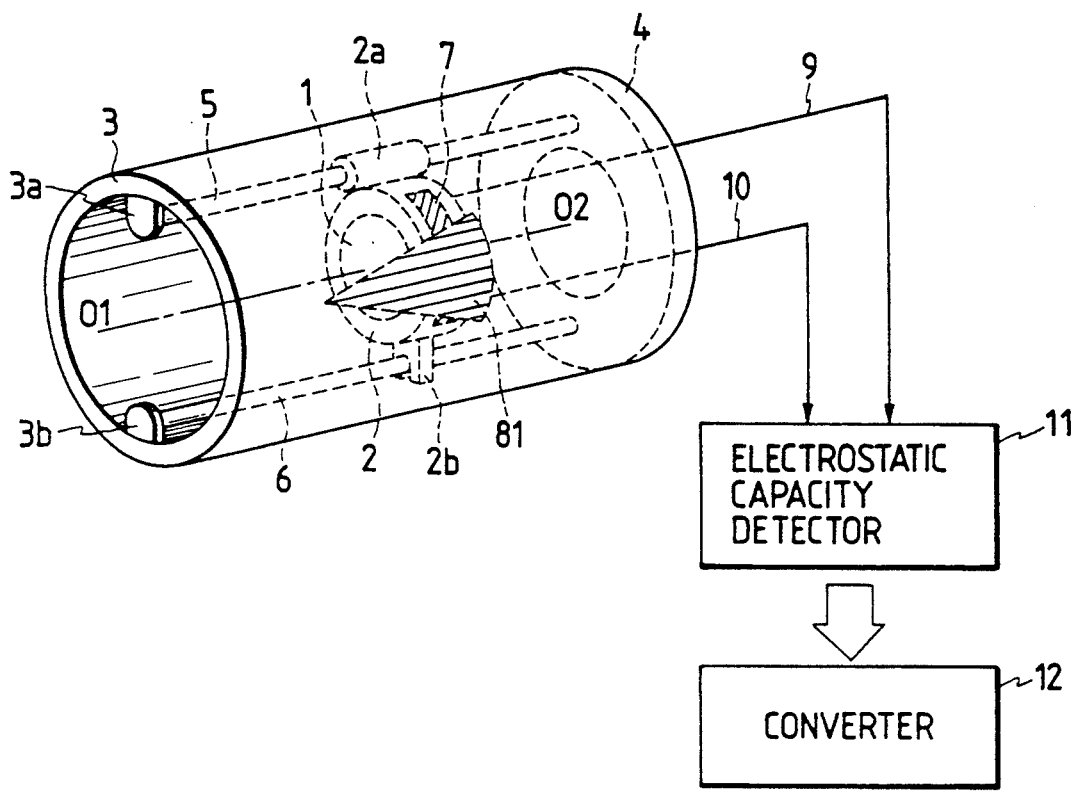
FIG. 1 is a perspective view of a position detecting device according to a first embodiment of the present invention.
Figure 2:
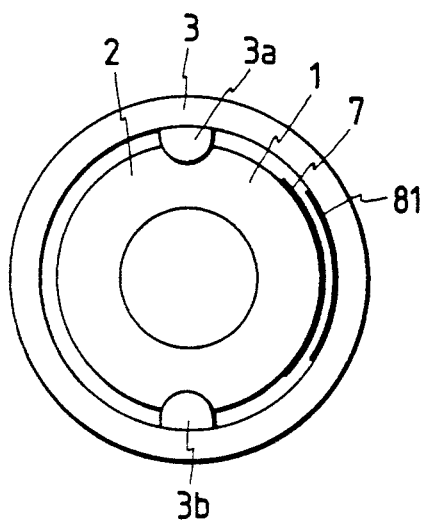
FIG. 2 is a cross-sectional view of the position detecting device according to the first embodiment of the present invention.

FIG. 1 is a perspective view showing a first embodiment of the present invention, and FIG. 2 is a cross-sectional view thereof.

A lens 1 is held by a lens holding frame 2 which is a movable barrel, and the lens holding frame 2 is provided with a sleeve 2a and a detent member 2b. Protruded portions 3a and 3b are provided on the upper and lower portions, respectively, of one end of a fixed barrel 3 as viewed in FIG. 1, and two guide bars 5 and 6 are fixed in parallelism to the direction of the optical axis (01-02) between the protruded portions 3a, 3b and a holding member 4 mounted on the other end of the fixed barrel 3. The sleeve 2a and detent member 2b of the lens holding frame 2 are fitted to the two guide bars 5 and 6 and consequently, by the lens holding frame 2 sliding on the guide bars 5 and 6, the lens 1 is moved in and relative to the fixed barrel 3 in the direction of the optical axis of the lens 1. An electrode 7 is provided on a portion of the outer periphery of the lens holding frame 2, and an electrode 81 is provided at a location inside the fixed barrel 3 which is opposed to the electrode 7, and a variable capacitor is formed by these electrodes 7 and 81, and these electrodes are disposed at a predetermined interval and in non-contact with each other.

In FIG. 1, the reference numerals 9 and 10 designate signal lines connected to the electrodes 7 and 81, respectively, the reference numeral 11 denotes an electrostatic capacity detector, and the reference numeral 12 designates a converter for converting the electrostatic capacity obtained by the electrostatic capacity detector 11 into lens position information.

Figure 3:
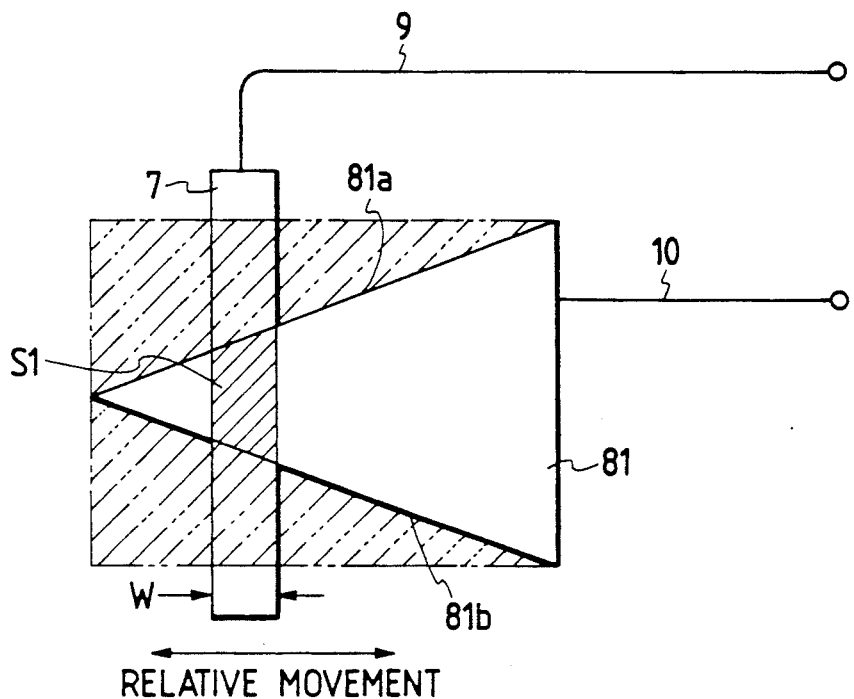
FIG. 3 is a developed view showing the electrodes of FIG. 1.

FIG. 3 is a developed view showing the electrode 7 peripherally on the lens holding frame 2 and the electrode 81 peripherally provided in the fixed barrel 3 as they are made planar.

The electrode 7 is a rectangular electrode having a predetermined width W relative to the direction of relative movement between the two electrodes, and the electrode 81 disposed in opposed relationship therewith is a triangular electrode having two end sides 81a and 81b each having a predetermined inclination with respect to the direction of relative movement.

The operation of the position detecting apparatus according to this first embodiment will now be described.

When the lens holding frame 2 is moved in the direction of the optical axis (01-02) relative to the fixed barrel 3 by some means, not shown, for example, a motor, or manual operation, the electrode 7 provided on the lens holding frame 2 and the electrode 81 provided in the fixed barrel 3 are moved relative to each other in the direction of arrow indicated in FIG. 3. Since the electrode 81 is of a triangular shape having two end sides 81a and 81b each having an inclination with respect to the direction of relative movement, the opposed area S1 (indicated by hatching in FIG. 3) between the two electrodes is increased or decreased by this relative movement, whereby the electrostatic capacity of the capacitor formed by the two electrodes is varied. The electrostatic capacity of this capacitor is detected as a signal corresponding to the absolute position information of the lens 1 by the electrostatic capacity detector 11 through the signal lines 9 and 10 connected to the electrodes 7 and 81, respectively, and this electrostatic capacity is sent to the converter 12 and converted into lens position information by this converter 12.

In this embodiment, the electrode 81 is of a triangular shape having end sides 81a and 81b each having an inclination with respect to the direction of relative movement of the two electrodes and therefore, the opposed area S1 between the electrodes is increased or decreased by the relative movement, whereby the position of the lens 1 which could theretofore be known only from the relative position can be known as the absolute position as previously described, and the circuit construction of the next stage can be simplified as compared with the prior art. Also, the electrode 81 is of a shape having an inclination with respect to the direction of relative movement (the end sides 81a, 81b) and therefore, for example, screws or the like can be disposed in the positions indicated by dots-and-dash hatching in FIG. 3, and this contributes to the compactness of the apparatus.

In the present embodiment, design is made such that the lens 1 is moved by the sliding movement between the sleeve 2a and detent member 2b provided on the lens holding frame 2 and the two guide bars 5, 6, but besides, this embodiment is also applicable, for example, to a system in which direct contact is established between the outside direction of the lens holding frame 2 and the inside diameter of the fixed barrel 3 to thereby move the lens. In such case, of course, the surfaces of the electrodes mounted on the exterior of the lens holding frame 2 and in the interior of the fixed barrel 3 are provided with coating so that electrical insulation can be kept therebetween.

Also, in the present embodiment, the triangular electrode 81 is provided in the fixed barrel 3, but depending on the kind of the position detecting device (the shapes of the fixed barrel and movable barrel), it is possible to provide the rectangular electrode 7 in the fixed barrel 3 and provide the triangular electrode 81 on the lens holding frame 2.

Figure 4:
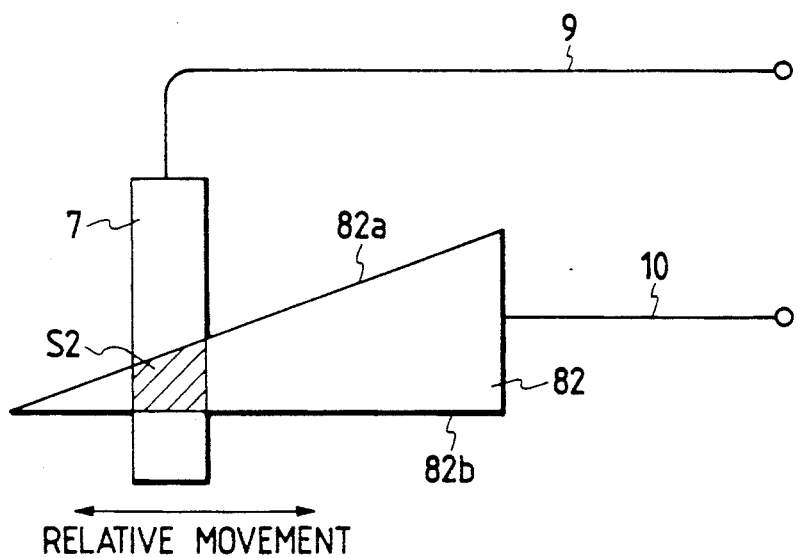
FIG. 4 is a developed view showing another example of the triangular electrode.

Also, the shape of the electrode having inclinations with respect to the direction of relative movement may be that of an electrode 82 shown in FIG. 4 wherein one end side 82a alone has an inclination with respect to the direction of relative movement and the other end side 82b is parallel to the direction of relative movement.

Figure 5:
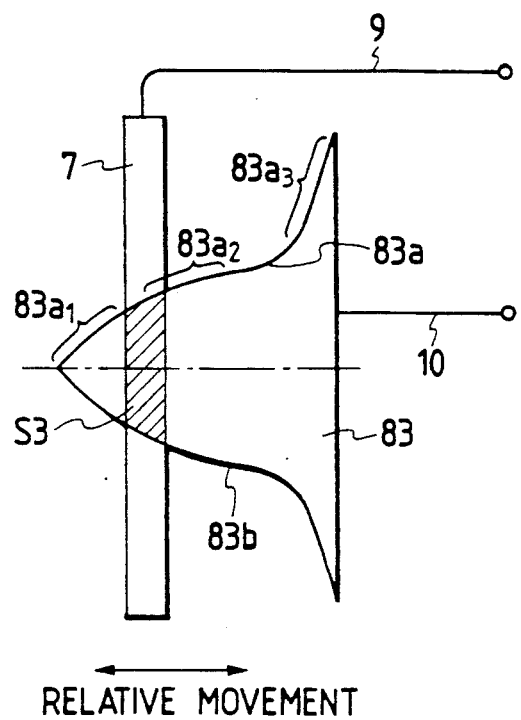
FIG. 5 is a developed view showing electrodes in a second embodiment of the present invention.

FIG. 5 is a developed view of the electrodes of a position detecting device according to a second embodiment of the present invention. In this embodiment, the locations at which the electrodes are mounted on the lens holding frame and in the fixed barrel and the other constructions are similar to those in the first embodiment and are not shown.

In this second embodiment, the electrode 7 provided on the lens holding frame, not shown, is an electrode having a predetermined width W relative to the relative movement between the two electrodes as in the first embodiment, and the electrode 83 provided in the fixed barrel, not shown, in opposed relationship therewith is an electrode having end sides 83a and 83b having varying inclinations with respect to the direction of relative movement.

Figure 6:
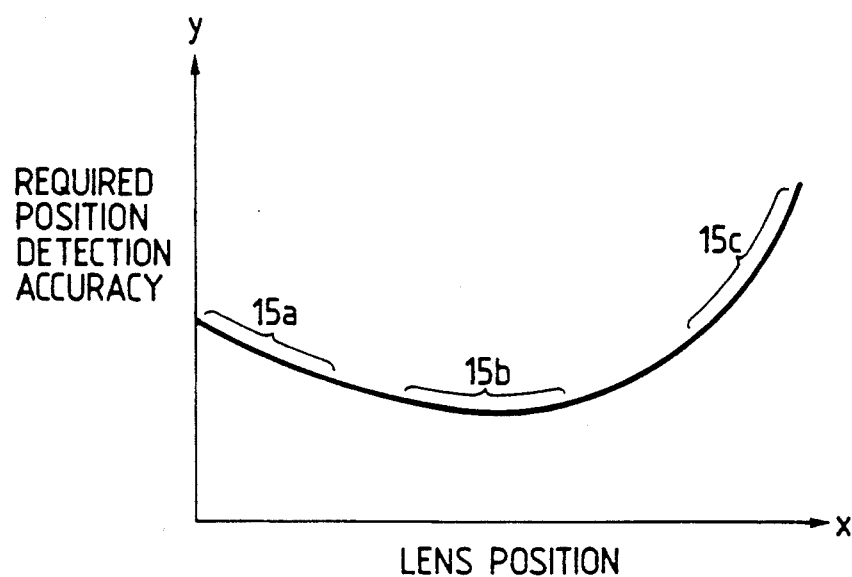
FIG. 6 is a graph showing the required position accuracy of a lens in the second embodiment of the present invention.

FIG. 6 is a graph in which the x-axis represents the lens position and the y-axis represents the required position detection accuracy and which shows that the required position detection accuracy differs for each lens position. The inclinations of the end sides 83a and 83b of the electrode 83, as shown in this figure, are determined correspondingly to the lens in which the required position detection accuracy varies for the lens position.

The portion for an area 15a in which the required position detection accuracy is medium has the shape of an end side 83a1 having a medium inclination on the end side 83a of the electrode 83, the portion for an area 15b in which the required position detection accuracy is gentle has the shape of an end side 83a2 having a small inclination on the end side 83a of the electrode 83, and the portion for an area 15c in which the required position detection accuracy is severe has the shape of an end side 83a3 having a great inclination on the end side 83a of the electrode 83. This also holds true of the end side 83b. Also, as in the first embodiment, the interval between the electrode 7 and the electrode 83 is constant and these electrodes are disposed in non-contact with each other.

The operation of the position detecting device according to this embodiment will now be described.

Figure 7:
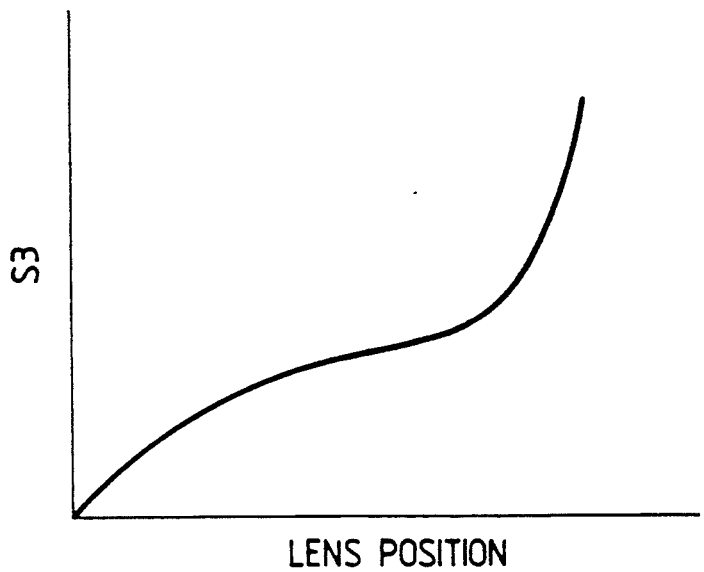
FIG. 7 is a graph showing the relation between the lens position and the opposed area in the second embodiment of the present invention.

When the lens holding frame 2 is moved in the direction of the optical axis relative to the fixed barrel 3, the electrode 7 provided on the lens holding frame 2 and the electrode 83 provided in the fixed barrel 3 are moved relative to each other in the driection indicated in FIG. 5. Since the electrode 83 has the inclinations as described above on the end sides 83a and 83b thereof, the opposed area S3 of the electrode 7 and the electrode 83 is increased or decreased by the relative movement of the two electrodes, and the opposed area S3 of the electrode 7 and the electrode 83 relative to the lens position assumes a curve varying in conformity with the shapes of the end sides 83a and 83b of the electrode 83 as shown in FIG. 7. Accordingly, as the electrostatic capacity of the capacitor formed by the two electrodes, there is obtained a value proportional to the opposed area S3 of FIG. 7 for the lens position (see FIG. 8). This electrostatic capacity is detected as a signal corresponding to the absolute position of the lens by the electrostatic capacity detector 11 shown in the first embodiment through signal lines 9 and 10 connected to the electrode 7 and the electrode 83, respectively, and this electrostatic capacity is sent to the converter 12 and converted into lens position information as in the first embodiment.

Figure 8:
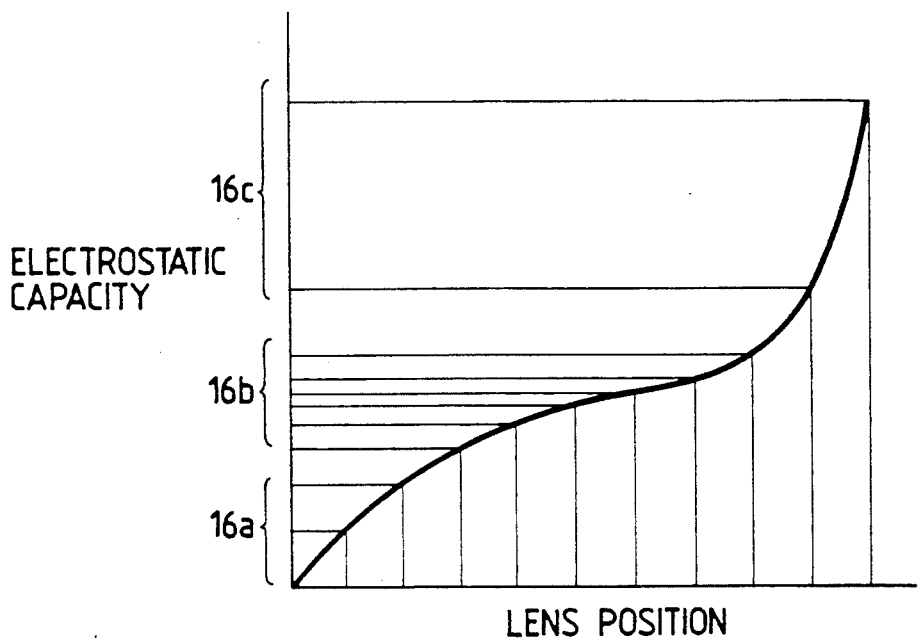
FIG. 8 is a graph showing the relation between the lens position and electrostaic capacity in the second embodiment of the present invention.

In this embodiment, the inclinations of the end sides 83a and 83b of the electrode 83 are made to correspond to the lens as shown in FIG. 6 wherein the required position detection accuracy varies relative to the lens position, whereby in the area 15a wherein the required position detection accuracy is medium, as shown in FIG. 8, the electrostatic capacity provided by the capacitor has medium resolving power (16a), and in the area 15b wherein the required position detection accuracy is gentle, the electrostaric capacity provided by the capacitor has small resolving power (16b), and in the area 15c wherein the required position detection accuracy is severe, the electrostatic capacity provided by the capacitor has great resolving power (16c). Thus, for each lens position, the end sides 83a and 83b of the electrode 83 are given inclinations having resolving power which can satisfy the lens position detection accuracy, and in whatever position the lens may be, always accurate position information can be output.

In this embodiment, a shape like that of the electrode 83 is adopted for the lens which requires the position detection accuracy as shown in FIG. 6, whereas the present invention is not restricted to such relation, but is also applicable to lenses having other various characteristics of required position detection accuracy.

Figure 9:
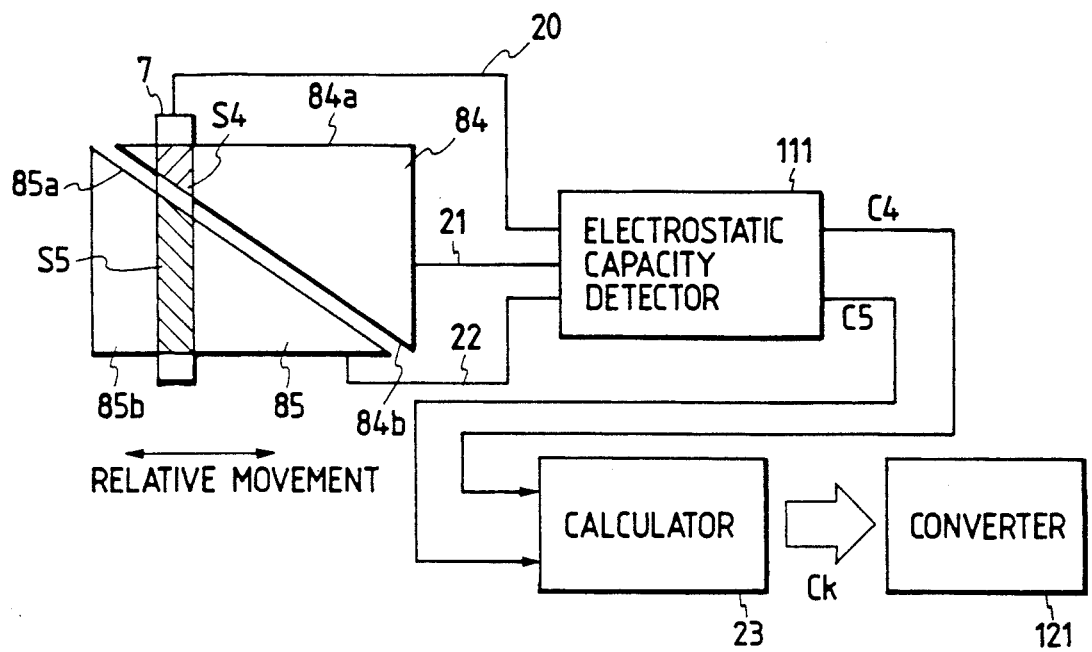
FIG. 9 shows the shape of each electrode and the construction of essential portions in a third embodiment of the present invention.
Figure 10:
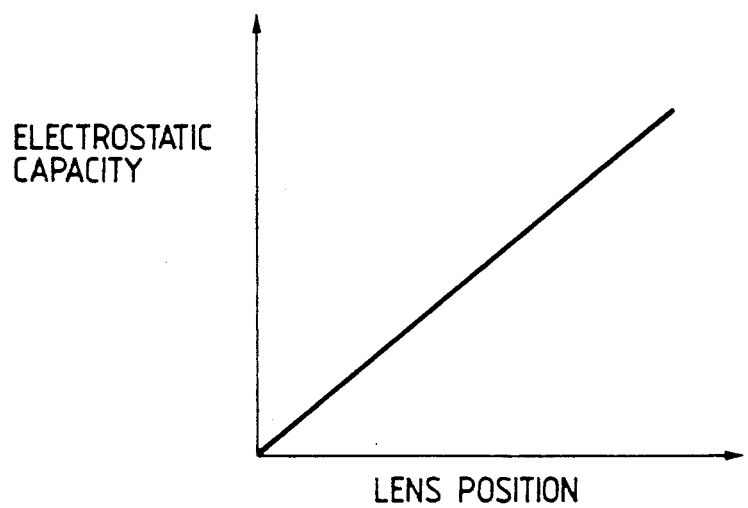
FIG. 10 is a graph showing the relation between the lens position and electrostatic capacity in an apparatus according to the prior art.

FIG. 9 shows the electrodes of a position detecting apparatus according to a third embodiment of the present invention and the construction of the essential portions thereof, and the location at which the electrode is mounted in the fixed barrel is similar to that in the first embodiment.

This third embodiment has two electrodes 84 and 85 opposed to the electrode 7, and the electrode 84 has an end side 84a parallel to the direction of relative movement between the electrodes and an end side 84b having an inclination with respect to the direction of relative movement, and the electrode 85 has an end side 85a having an inclination with respect to the direction of relative movement and an end side 85b parallel to the direction of relative movement. The electrode 7 and the electrode 84 form a pair of capacitors, and the electrode 7 and the electrode 85 form a pair of capacitors, and thus, two pairs of capacitors in total are formed.

The operation of the position detecting device according to this embodiment will now be described.

When the lens holding frame 2 is moved in the direction of the optical axis relative to the fixed barrel 3, the electrode 7 provided on the lens holding frame 2 and the electrodes 84 and 85 provided in the fixed barrel 3 are moved relative to one another in the direction indicated in FIG. 9. By this relative movement, the opposed area S4 of the electrode 7 and the electrode 84 and the opposed area S5 of the electrode 7 and the electrode 85 are increased or decreased, and electrostatic capacity C4 corresponding to the opposed area S4 is detected by an electrostatic capacity detector 111 through signal lines 20 and 21, and electrostatic capacity C5 corresponding to the opposed area S5 is detected by the electrostatic capacity detector 111 through signal lines 20 and 22. These electrostatic capacities C4 and C5 are thereafter sent to a calculator 23, by which the following calculation is effected to obtain electrostatic capacity Ck corresponding to the lens position:

$$Ck = (C5 - C4)/(C5 + C4).$$

The electrostatic capacity Ck thus obtained is sent to a converter 121, by which it is converted into lens position data.

In this embodiment, the electrostatic capacity Ck corresponding to the lens position which is found from the electrostatic capacities C4 and C5 obtained from the two pairs of variable capacitors is substantially invariable even when the intervals between the electrode 7 and the electrodes 84, 85 are varied by back-lash, strain, deformation, temperature, manufacturing error, etc., and therefore, the influences of these factors upon the position detection accuracy can be reduced.

In the present embodiment, the end sides 84a and 85b of the electrodes 54 and 85 opposed to the electrode 7 are straight lines parallel to the direction of relative movement and the end sides 84b and 85b of the electrodes 54 and 85 are straight lines having inclinations with respect to the direction of relative movement, but it is also possible to make, for example, the shapes of the end sides 84b and 85a such as shown in the second embodiment, and the end sides 84a, 84b, 85a and 85b can be formed into any shapes as required.

According to the above-described embodiments, at least one end side of the electrode mounted in the fixed barrel is formed into a shape having an inclination with respect to the direction of relative movement, i.e., a shape which assumes a different opposed area (which can provide an electrostatic capacity) in conformity with the position on each occasion when the lens holding frame (the lens) is moved relative to the fixed barrel, and therefore, the absolute position of the lens can be directly obtained and the circuit construction of the next stage can be simplified as compared with the prior art. Also, as previously described, at least one end side of the electrode is formed into a shape having an inclination with respect to the direction of relative movement and therefore, for example, screws or the like can be disposed in that portion wherein no part could heretofore be disposed and from this viewpoint, the compactness of the device can be achieved.

Also, in the second embodiment, for each lens position, the end sides 83a and 83b of the electrode 83 are given inclinations having resolving powers which can satisfy the lens position detection accuracy and therefore, in whatever position the lens may be, it becomes possible to output always accurate lens position information.

Also, as in the third embodiment, the electrode 84 has the end side 84a parallel to the direction of relative movement between the electrodes and the end side 84b having an inclination with respect to the direction of relative movement, and the electrode 85 has the end side 85a having an inclination with respect to the direction of relative movement and the end side 85b parallel to the direction of relative movement and therefore, a substantially invariable electrostatic capacity is created even when the intervals between these electrodes 84, 85 and the electrode 7 mounted on the movable barrel side are varied by the back-lash, strain, deformation, temperature, manufacturing error, etc. of each part, and the influences of these factors upon lens position information can be reduced.

Figure 11:
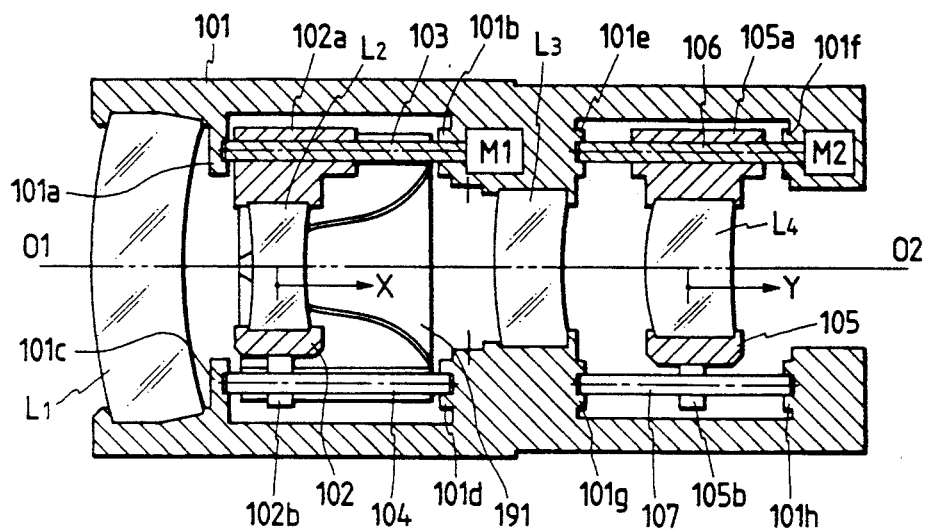
FIG. 11 is a longitudinal cross-sectional view of a lens barrel showing a fourth embodiment of the present invention.
Figure 12:
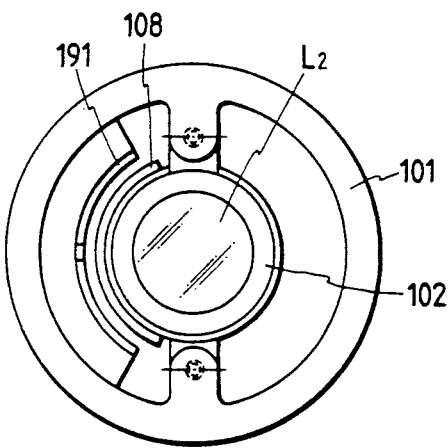
FIG. 12 is a transverse cross-sectional view of the lens barrel showing the fourth embodiment of the present invention.
Figure 13:
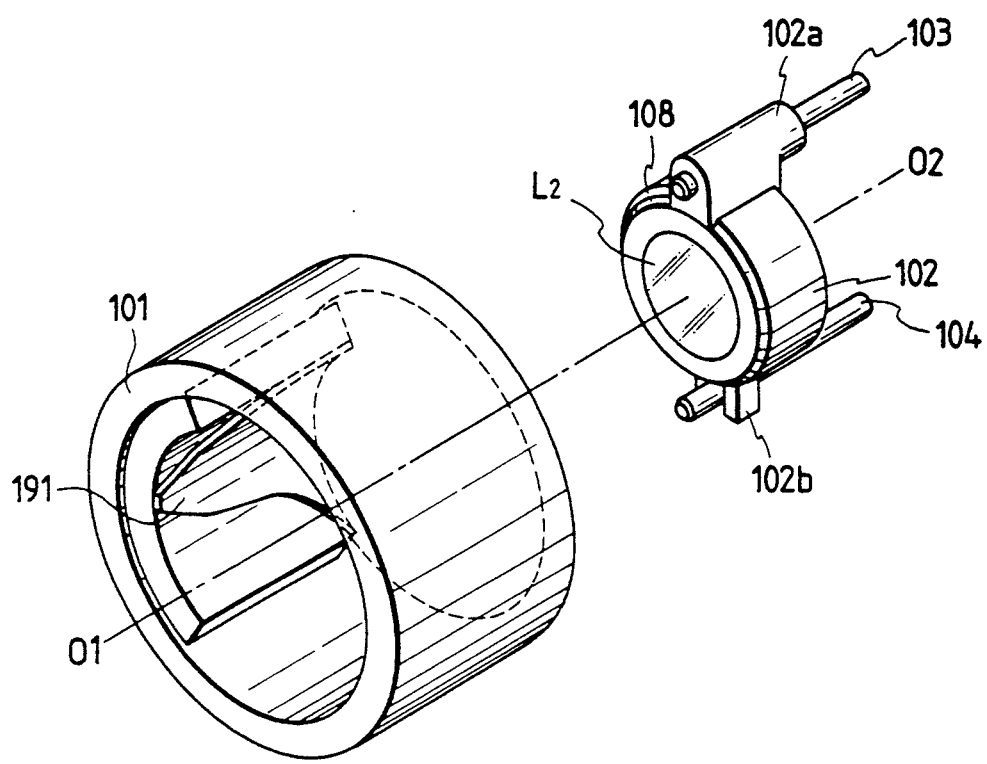
FIG. 13 is a perspective view of the essential portions of the lens barrel showing the fourth embodiment of the present invention.
Figure 16:
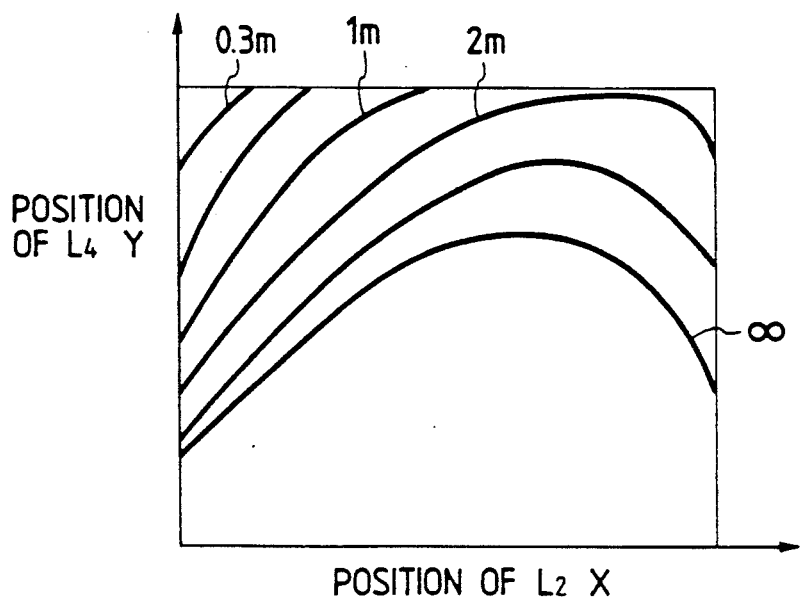
FIG. 16 is a graph showing the relation between the position X of a lens L2 and the position of a lens L4.
Figure 17:
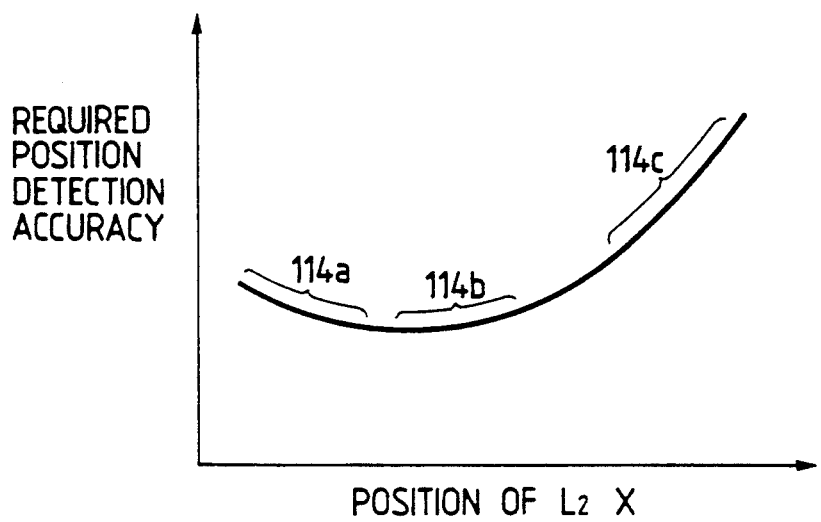
FIG. 17 is a graph showing the relation between the position X of the lens L2 and the required position detection accuracy thereof.

FIG. 11 is a longitudinal cross-sectional view showing a fourth embodiment of the present invention, FIG. 12 is a transverse cross-sectional view of the fourth embodiment, and FIG. 13 is a perspective view of the essential portions of the fourth embodiment. The lens barrel of the present embodiment has an optical system comprising lenses L1 and L3 fixed to a fixed barrel 101 and lenses L2 and L4 movable in the direction of the optical axis $\overline{0102}$. This optical system is a zoom lens which continues to form an image on the image plane I and effects magnification change when the position Y of the lens L4 for correction during magnification change and for focus adjustment satisfies the relation of FIG. 16 to the position X of the lens L2 as a magnification changing lens, and in that case, the position detection accuracy necessary to detect the position of the lens L2 in order to ensure the imaging by the optical system differs depending on the position of the lens L2, as shown in FIG. 17. The lens L2 is held by a lens holding frame 102 which is a movable barrel, and this lens holding frame 102 is provided with a sleeve 102a having an internal thread and a detent member 102b. The fixed barrel 101 is provided with protruded portions 101a, 101b, 101c and 101d, and a threaded bar 103 and a guide bar 104 which are parallel to the direction of the optical axis $\overline{0102}$ are supported between the protruded portions 101a and 101b and between the protruded portions 101c and 101d. The internal thread of the sleeve 102a of the lens holding frame 102 is in meshing engagement with the threaded bar 103 and further, the detent member 102b is fitted to the guide bar 104 and therefore, when a motor M1 is rotated, the lens holding frame 102 is moved in the direction of the optical axis $\overline{0102}$ and the lens L2 is also moved in and relative to the fixed barrel 101 in the direction of the optical axis. The lens holding frame 102 may be driven by other means, for example, a voice coil motor or manual operation.

Also, the lens L4, like the lens L2, is held by a lens holding frame 105 which is a movable barrel, and this lens holding frame 105 is provided with a sleeve 105a having an internal thread and a detent member 105b. The fixed barrel 101 is provided with protruded portions 101e, 101f, 101g and 101h, and a threaded bar 106 and a guide bar 107 which are parallel to the direction of the optical axis $\overline{(0102)}$ are supported between the protruded portions 101e and 101f and between the protruded portions 101g and 101h. The internal thread of the sleeve 105a of the lens holding frame 105 is in meshing engagement with the threaded bar 106 and further, the detent member 105b is fitted to the guide bar 107 and therefore, when a motor M2 is rotated, the lens holding frame 105 is moved in the direction of the optical axis 0102 and the lens L4 is also moved in and relative to the fixed barrel 101 in the direction of the optical axis. The lens holding frame 105 may also be driven by other means, for example, a voice coil motor or manual operation.

Figure 14:
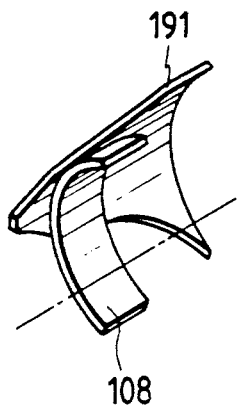
FIG. 14 is a perspective view of the electrodes of FIG. 11.
Figure 15:
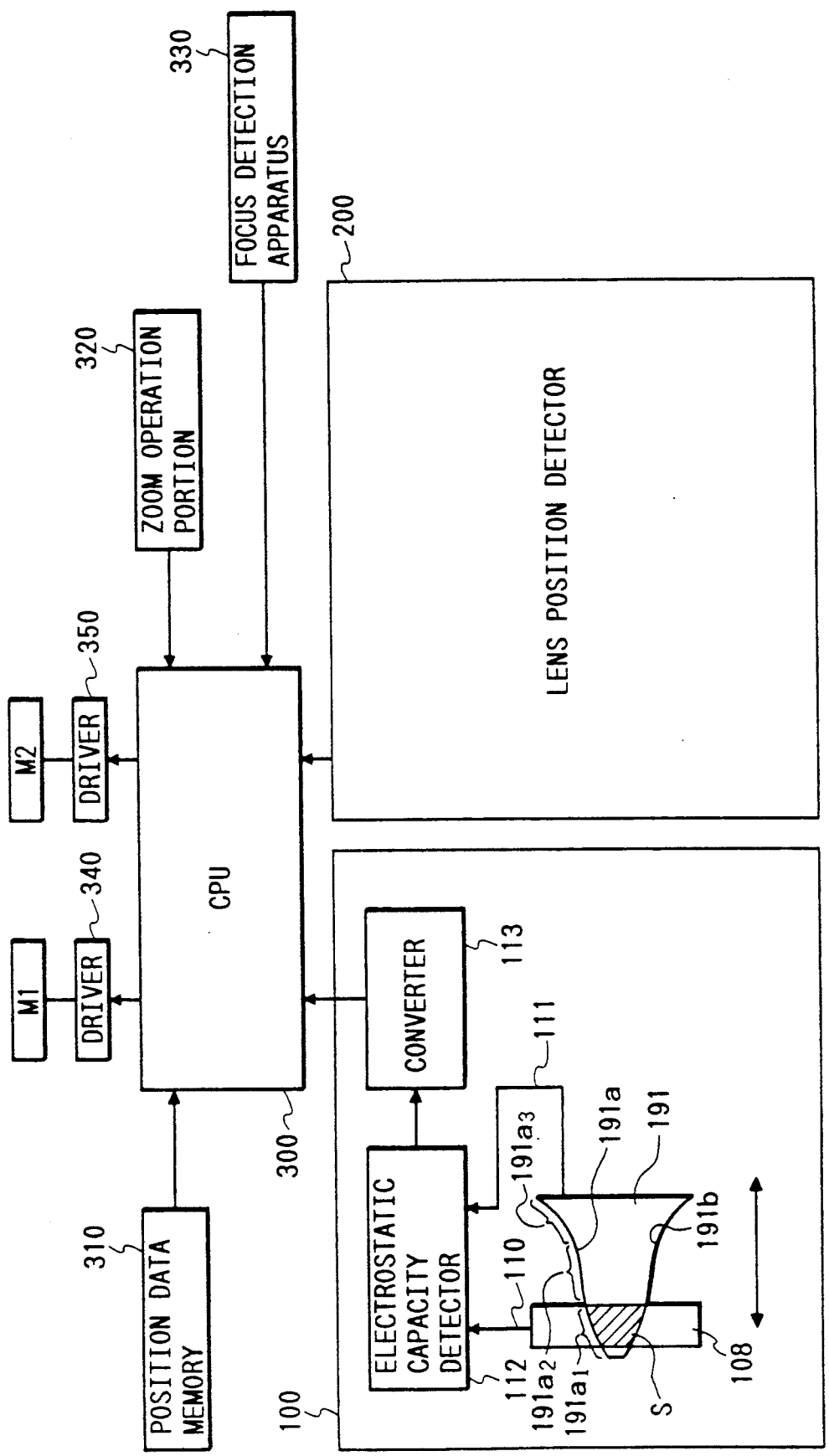
FIG. 15 is a general construction diagram including a developed view of the electrodes of FIG. 11.

An electrode 108 is provided on a portion of the outer periphery of the lens holding frame 102, and an electrode 191 is provided at a location inside the fixed barrel 101 which is opposed to the electrode 108. FIGS. 12 through 14 illustrate that electrodes 108 and 191 have arcuate surfaces, i.e., curved surfaces. A variable capacitor is formed by these electrodes 108 and 191, and the interval between these electrodes is constant and the electrodes are disposed in non-contact with each other. FIG. 14 is a perspective view showing the opposed state of the electrodes 108 and 191 and FIG. 15 is a general construction view including a developed view showing the electrode 108 peripherally provided on the lens holding frame 102 and the electrode 191 peripherally provided in the fixed barrel 101 as they are made planar. In FIG. 15, the reference numerals 110 and 111 designate signal lines connected to the electrodes 108 and 191, respectively, the reference numeral 112 denotes an electrostatic capacity detector, and the reference numeral 113 designates a converter for converting the electrostatic capacity obtained by the electrostatic capacity detector 112 into lens position information. These together constitute a position detecting device 100 for the lens L2. A position detecting device 200 for the lens L4 is of a similar construction.

The electrode 108 is an electrode having a predetermined width W with respect to the direction of relative movement between the two electrodes, and the electrode 191 disposed in opposed relationship therewith is an electrode of a shape having two end sides 191a and 191b having varying inclinations with respect to the direction of relative movement. In the present embodiment, the lens L2 has the position detection accuracy as shown in FIG. 17 depending on the lens position.

The portion for an area 114a in which the required position detection accuracy is medium is of the shape of an end side 191a1 having a medium inclination on the end side 191a of the electrode 191, the portion for an area 114b in which the required position detection accuracy is gentle is of the shape of an end side 191a2 having a small inclination on the end side 191a of the electrode 191, and the portion for an area 114c in which the required position detection accuracy is severe is of the shape of an end side 191a3 having a great inclination on the end side 191a of the electrode 191. This also holds true of the end side 191b. The reference numeral 300 designates a CPU, the reference numeral 310 denotes an in-focus position data memory for the lenses L2 and L4 shown in FIG. 16, the reference numeral 320 designates a zoom operation portion, the reference numeral 330 denotes a focus detection apparatus such as TVAF, the reference numerals 340 and 350 designate motor drive circuits, and M1 and M2 denote the motors shown in FIG. 11.

The operation of the lens barrel according to this embodiment will now be described.

Figure 18:
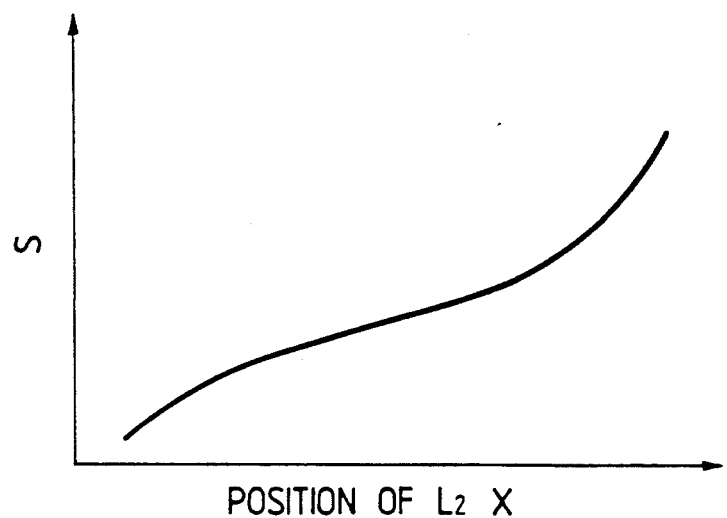
FIG. 18 is a graph showing the relation between the position of the lens L2 and the opposed area of the electrodes.

When the motor M1 is driven by the operation of the zoom operation portion 320, the lens holding frame 102 is moved in the direction of the optical axis relative to the fixed barrel 101, and the electrode 108 provided on the lens holding frame 102 and the electrode 191 provided in the fixed barrel 101 are moved relative to each other in the direction of arrow indicated in FIG. 15. Since the electrode 191 has the inclinations as previously described on the end sides 191a and 191b thereof, the opposed area S (indicated by hatching in FIG. 15) of the electrodes 108 and 191 is increased or decreased by the relative movement of the two electrodes, and the opposed area S of the electrodes 108 and 191 to the lens position assumes a curve varying in conformity with the shapes of the end sides 191a and 191b of the electrode 191 as shown in FIG. 18. Accordingly, as the electrostatic capacity of the capacitor formed by the two electrodes, a value proportional to the opposed area S of FIG. 18 is obtained for the lens position (see FIG. 19). This electrostatic capacity is detected as a signal corresponding to the absolute position of the lens by the electrostatic capacity detector 112 through the signal lines 110 and 111 connected to the electrode 108 and the electrode 191, respectively, and the electrostatic capacity is sent to the converter 113 and converted into lens position information. This position information is sent to the CPU 300 as a lens control unit, and this CPU 300 determines the position of the lens L4 in accordance with FIG. 16 by the use of the information of the lens position data memory 310, and drives the motor M2 to thereby move the lens holding frame 105. The position of the lens L2 is detected by the position detector 200, and the driving of the motor M2 is stopped at a proper position. The information from the focus detection apparatus 330 is used to correct the driving speed of the motor M2.

Figure 19:
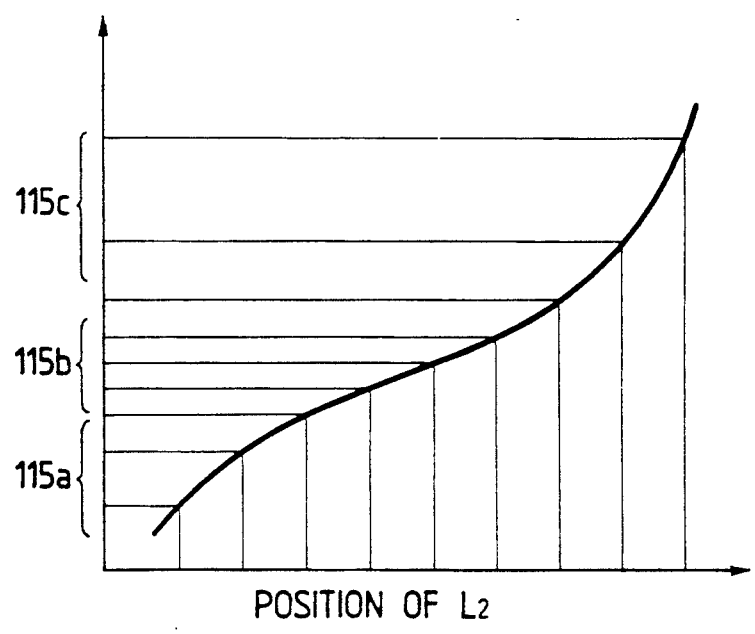
FIG. 19 is a graph showing the relation between the position of the lens L2 and the electrostatic capacity.

In this embodiment, the inclinations of the end sides 191a and 191b of the electrode 191 are made to correspond to the lens in which the required position detection accuracy varies for the lens position as shown in FIG. 17, whereby in the area 114a wherein the required position detection accuracy is medium, as shown in FIG. 19, the electrostatic capacity provided by the capacitor has a medium resolving power (115a), and in the area 114b wherein the required position detection accuracy is gentle, the electrostatic capacity provided by the capacitor has a small resolving power (115b), and in the area 114c wherein the required position detection accuracy is severe, the electrostatic capacity provided by the capacitor has a great resolving power (115c). Thus, on the basis of the variation in the positions of the lenses L2 and L4 shown in FIG. 16 which can maintain the in-focus during magnification change, the end sides 191a and 191b of the electrode 191 are given inclinations having resolving powers necessary and sufficient to satisfy the lens position detection accuracy, and in whatever position the lens may be, it becomes possible to obtain always accurate position information without making the electrodes large indiscriminately.

The control of the CPU 300 will now be described with reference to the flow chart of FIG. 22.

At a step 1, whether the zoom operation portion 320 is operated in the telephoto or wide direction is detected, and if there is a zoom operation, advance is made to a step 2. At the step 2, the M1 is driven in the forward direction or the reverse direction in conformity with the direction (telephoto or wide) in which zoom has been operated. At a step 3, the position of the lens L2 is detected by the lens position detector means 200, and at a step 4, the position of the lens L4 is detected by the lens position detector means 200. At a step 5, on the basis of the position information of the lenses L2 and L4 detected at the steps 3 and 4, the data of the direction and speed of movement of the lens L4 for maintaining the in-focus are read out from the position data memory 310. At a step 6, the motor M2 is driven in the forward direction or the reverse direction on the basis of the data obtained at the step 5. At a step 7, whether the lens is in front focus or rear focus relative to the actual in-focus position at the movement speed of the lens L4 based on the memory data is discriminated by the focus detection apparatus 330, and at steps 8 and 9, the compensation of the driving speed of the motor M2 based on the shift direction of the focus is effected. At a step 10, the control of the steps 7-9 is continued until the maintenance of the in-focus is detected. When at a step 11, the stoppage control of the motor M1 is effected (for example, the zoom operation is stopped), the motor M2 is stopped at a step 12.

In this embodiment, a shape like that of the electrode 109 is adopted for the lens which requires the position detection accuracy as shown in FIG. 17, but such shape is also adaptable to lenses having other various characteristics of required position detection accuracy.

Figure 20:
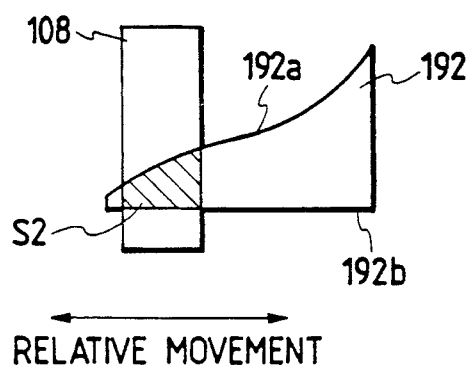
FIG. 20 is a developed view showing another example of the electrode.
Figure 21:
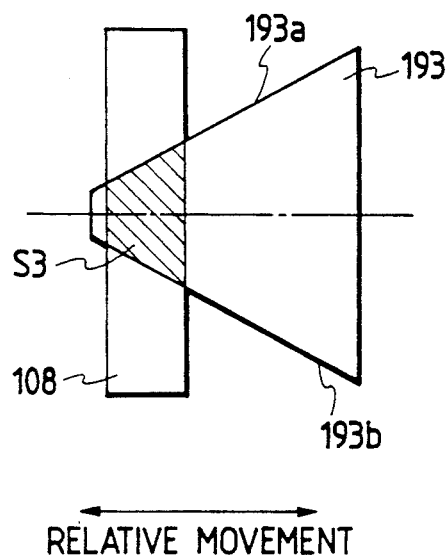
FIG. 21 is a developed view showing still another example of the electrode.

The shape of the electrode having inclinations with respect to the direction of relative movement may also be that of an electrode 192 shown in FIG. 20 wherein one end side 192a alone has an inclination with respect to the direction of relative movement and the other end side 192b is parallel to the direction of relative movement. Also, where it is desired to make the position detection accuracy the same in any lens position, as shown in FIG. 21, the end sides 193a and 193b of an electrode having inclinations with respect to the direction of relative movement can be formed into straight lines having a predetermined inclination with respect to the direction of relative movement.

Also, in the present embodiment, the electrode 191 (192, 193) having inclinations with respect to the direction of relative movement is provided in the fixed barrel 101, but depending on the kind of the position detecting apparatus (the shapes of the fixed barrel and the lens holding frame), it is also possible to provide the rectangular electrode 108 in the fixed barrel 101 and provide on the lens holding frame the electrode 191 (192, 193) having inclinations with respect to the direction of relative movement.

Although the present embodiment has been described with respect to the position detection of only the movable lens L2, it is of course possible to provide similar position detection means for the movable lens L4 as well.

As described above, according to the fourth embodiment, the lens position can be detected by the use of small electrodes and therefore, the optical apparatus itself can be made compact. Also, the position detection accuracy corresponding to the lens position can be varied by arbitrarily setting the inclinations of the end sides of the two electrodes and therefore, optical lens position detection accuracy can be obtained in respective lens positions and the movement control of a plurality of lenses can be effected accurately.

What is claimed is:

1. A position detecting device comprising:
   (a) a movable member;
   (b) a first electrode movable with movement of said movable member; and
   (c) a second electrode disposed at a location opposed to said first electrode, an edge of at least one of said first and second electrodes being inclined with respect to a direction of movement of said first electrode, the inclination of the edge varying in accordance with a position of said first electrode relative to said second electrode so that an area over which said first electrode and said second electrode overlap varies in response to relative movement of said first and second electrodes, to indicate an absolute position of said movable member with respect to said second electrode and to change a position detection accuracy in accordance with a position of said first electrode.

2. A device according to claim 1, wherein one of said first electrode and said second electrode has its edge inclined with respect to the direction of movement, and the other electrode, as compared with said one electrode, has a small width with respect to the direction of movement.

3. A device according to claim 2, wherein the one electrode is said second electrode, and the other electrode is said first electrode.

4. A device according to claim 2, wherein said first and second electrodes comprise electrodes having arcuate surfaces.

5. A device according to claim 1, wherein said first electrode is formed on said movable member, and said second electrode is formed in a fixed member.

6. A device according to claim 2, wherein the one electrode is formed in a fixed member, and the other electrode is formed on said movable member.

7. A device according to claim 2, wherein the length of the one electrode in the direction of movement is substantially equal to the range of movement of said movable member.

8. A device according to claim 1, wherein the variation in the inclinations of the edge comprises a combination of a plurality of arcs differing in curvature.

9. An optical apparatus having a position detecting device, comprising:
   (a) a first movable lens movable in a direction of an optical axis thereof;
   (b) first driving means for moving said first movable lens;
   (c) a second movable lens movable in a direction of an optical axis thereof;
   (d) second driving means for moving said second movable lens;
   (e) a first position detection device for detecting the position of said first movable lens, said first position detection device being provided with a first electrode movable with the movement of said first movable lens, and a second electrode disposed at a location opposed to said first electrode, an edge of at least one of said first electrode and said second electrode being inclined with respect to the direction of movement of said first electrode, the inclination of the edge varying in accordance with a position of said first electrode relative to said second electrode so that an area over which said first electrode and said second electrode overlap varies in response to relative movement of said first and second electrodes, to vary an electrostatic capacity to indicate an absolute position of said first movable lens with respect to said second electrode and to change a position detection accuracy in accordance with a position of said first electrode; and
   (f) movement control means for driving said second driving means to move said second movable lens using information regarding the absolute position of said first movable lens obtained by at least said first position detection device.

10. An optical apparatus according to claim 9, wherein the first movable lens performs magnification change, and said second movable lens performs compensation during magnification change.

11. An optical apparatus according to claim 9, wherein said second driving means comprises a motor as a drive source, and said movement control means controls the direction and speed of rotation of the motor.

12. An optical apparatus according to claim 9, wherein said first electrode is provided on a holding member for holding said first movable lens, and said second electrode is provided in a fixed member.

13. An optical apparatus according to claim 9, further comprising second position detection means for detecting the position of said second movable lens.

14. An optical apparatus according to claim 13, wherein said movement control means controls the driving of said second driving means on the basis of at least the position information of said first movable lens obtained by said first position detection device and the position information of said second movable lens obtained by said second position detection means.

15. An optical apparatus according to claim 12, further comprising focus detection means for detecting the focus state.

16. An optical apparatus according to claim 15, wherein said movement control means comprises means to compensate for the driving of said second driving means on the basis of the information of said focus detection means.

17. An optical apparatus according to claim 9, wherein one of said first electrode and said second electrode has its edge inclined with respect to the direction of movement, and the other electrode, as compared with said one electrode, has a small width with respect to the direction of movement.

18. An optical apparatus according to claim 17, wherein the one electrode is said second electrode, and the other electrode is said first electrode.

19. An optical apparatus according to claim 17, wherein the length of the one electrode in the direction of movement is substantially equal to the range of movement of said movable member.

20. An optical apparatus according to claim 9, wherein the variation in the inclinations of the edge comprises a combination of a plurality of arcs differing in curvature.

21. An optical apparatus according to claim 9, wherein said apparatus further comprises memory means and said movement control means controls the driving of said second driving means on the basis of memory information stored in said memory means.

* * * * *

UNITED STATES PATENT AND TRADEMARK OFFICE
CERTIFICATE OF CORRECTION

PATENT NO. : 5,317,351
DATED : May 31, 1994
INVENTOR(S) : HIROYUKI TAKAHARA, ET AL.

It is certified that error appears in the above-indentified patent and that said Letters Patent is hereby corrected as shown below: Title page:

Item: [57] ABSTRACT:

Line 5, "are" should read --is--.

COLUMN 5,

Line 26, "driection" should read --direction--.

COLUMN 8,

Line 23, "axis 0102" should read --axis $\overline{0102}$---.

COLUMN 12,

Line 23, "the" should read --said--; and
Line 46, "claim 12," should read --claim 9,--.

Signed and Sealed this

First Day of November, 1994

Attest:

*Attesting Officer*

BRUCE LEHMAN

*Commissioner of Patents and Trademarks*